US010887787B2

(12) United States Patent
Jheng et al.

(10) Patent No.: US 10,887,787 B2
(45) Date of Patent: Jan. 5, 2021

(54) REFLECTIVE QOS CONTROL IN WIRELESS COMMUNICATIONS

(71) Applicant: MediaTek Inc., Hsinchu (TW)

(72) Inventors: Yu-Syuan Jheng, Hsinchu (TW); Guillaume Sebire, Espoo (FI); Chien-Chun Huang-Fu, Hsinchu (TW); Mingcong Sun, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/197,359

(22) Filed: Nov. 21, 2018

(65) Prior Publication Data

US 2019/0159059 A1    May 23, 2019

Related U.S. Application Data

(60) Provisional application No. 62/589,012, filed on Nov. 21, 2017.

(51) Int. Cl.
*H04W 28/02*    (2009.01)
*H04L 12/927*   (2013.01)
*H04W 72/12*    (2009.01)
*H04W 28/24*    (2009.01)
*H04W 88/02*    (2009.01)

(52) U.S. Cl.
CPC ....... *H04W 28/0268* (2013.01); *H04L 47/805* (2013.01); *H04W 28/24* (2013.01); *H04W 72/1284* (2013.01); *H04W 88/02* (2013.01)

(58) Field of Classification Search
None
See application file for complete search history.

(56) References Cited

U.S. PATENT DOCUMENTS

| 2014/0233380 A1* | 8/2014 | Kim ............... H04W 28/24 370/230 |
| 2017/0111826 A1* | 4/2017 | Sankar ............ H04W 28/20 |
| 2018/0234876 A1* | 8/2018 | Jheng ............. H04L 47/2441 |
| 2018/0324633 A1* | 11/2018 | Lee ............... H04W 28/0268 |
| 2019/0028920 A1* | 1/2019 | Pan ............... H04W 28/0268 |
| 2019/0116517 A1* | 4/2019 | Liu ............... H04L 47/24 |

(Continued)

OTHER PUBLICATIONS

State Intellectual Property Office of China, International Search Report and Written Opinion for International Patent Application No. PCT/CN2018/116687, dated Feb. 21, 2019.

(Continued)

*Primary Examiner* — Otis L Thompson, Jr.
(74) *Attorney, Agent, or Firm* — Han IP PLLC; Andy M. Han

(57) ABSTRACT

Various examples pertaining to reflective quality of service (QoS) control in wireless communications are described. A user equipment (UE) receives from a wireless network control signaling that activates support of reflective QoS by the UE. The UE determines whether a predefined condition exists. The UE then indicates to the wireless network a change in a capability of the UE to support the reflective QoS responsive to the determining indicating that the predefined condition exists. When the UE receives from the wireless network control signaling that activates support of reflective QoS by the UE, the UE deletes one or more UE-derived QoS rules among a plurality of active UE-derived QoS rules each with a respective reflective QoS (RQ) timer running.

19 Claims, 5 Drawing Sheets

(56) References Cited

U.S. PATENT DOCUMENTS

| | | | | |
|---|---|---|---|---|
| 2019/0239113 A1* | 8/2019 | Wei | .................... | H04W 28/0263 |
| 2019/0261212 A1* | 8/2019 | Li | ...................... | H04W 28/0252 |
| 2019/0306744 A1* | 10/2019 | Huang-Fu | .............. | H04W 76/10 |
| 2019/0313468 A1* | 10/2019 | Talebi Fard | ......... | H04W 40/246 |
| 2019/0327635 A1* | 10/2019 | Wei | .................... | H04W 28/0263 |
| 2019/0335534 A1* | 10/2019 | Atarius | ............... | H04L 65/1069 |
| 2019/0349161 A1* | 11/2019 | Jin | ......................... | H04L 5/0048 |
| 2019/0349804 A1* | 11/2019 | Cho | .................... | H04W 28/0268 |
| 2019/0349810 A1* | 11/2019 | Cho | .................... | H04W 28/0268 |
| 2019/0357076 A1* | 11/2019 | Han | ...................... | H04W 80/08 |
| 2019/0357295 A1* | 11/2019 | Kim | .................... | H04W 68/005 |
| 2020/0008118 A1* | 1/2020 | Han | .................... | H04W 68/005 |
| 2020/0120539 A1* | 4/2020 | You | .................... | H04W 28/0268 |
| 2020/0120738 A1* | 4/2020 | Kawasaki | .............. | H04W 28/06 |
| 2020/0145884 A1* | 5/2020 | Guo | ...................... | H04W 28/24 |

OTHER PUBLICATIONS

Intel, Resolving Editor's notes on Reflective QoS, SA WG2 Meeting #122, Jun. 26-30, 2017, San Jose Del Cabo, Mexico.
NTT DOCOMO, Indicating the use of Reflective QoS to RAN, SA WG2 Meeting #122, Jun. 26-30, 2017, Cabo, Mexico.
Samsung et al., Deletion of UE derived QoS Rules triggered by PDU session deactivation or release, SA WG2 Meeting #S2-122, Jun. 26-30, 2017, San Jose Del Cabo, Mexico.
Mediatek Inc., pCR 23.501 Deactivation of UE-derived QoS Rules for Reflective QoS, SA WG2 Meeting #122bis, Aug. 21-25, 2017, Sophia Antipolis, France.

* cited by examiner

400

SUPPORT, BY A PROCESSOR OF A USER EQUIPMENT (UE), REFLECTIVE QUALITY OF SERVICE (QoS) IN A WIRELESS COMMUNICATION WITH A WIRELESS NETWORK BY GENERATING A PLURALITY OF ACTIVE UE-DERIVED QoS RULES
410

DELETE, BY THE PROCESSOR, ONE OR MORE UE-DERIVED QoS RULES AMONG A PLURALITY OF ACTIVE UE-DERIVED QoS RULES EACH WITH A RESPECTIVE REFLECTIVE QoS (RQ) TIMER RUNNING
420

500

SUPPORT, BY A PROCESSOR OF A USER EQUIPMENT (UE), REFLECTIVE QUALITY OF SERVICE (QOS) IN A WIRELESS COMMUNICATION WITH A WIRELESS NETWORK
510

DELETE, BY THE PROCESSOR, ONE OR MORE UE-DERIVED QOS RULES UPON RELEASE OF A PROTOCOL DATA UNIT (PDU) SESSION IN THE WIRELESS COMMUNICATION WITH THE WIRELESS NETWORK
520

REFLECTIVE QOS CONTROL IN WIRELESS COMMUNICATIONS

CROSS REFERENCE TO RELATED PATENT APPLICATION(S)

The present disclosure is part of a non-provisional application claiming the priority benefit of U.S. Patent Application No. 62/589,012, filed on 21 Nov. 2017, the content of which is incorporated by reference in its entirety.

TECHNICAL FIELD

The present disclosure is generally related to wireless communications and, more particularly, to reflective quality of service (QoS) control in wireless communications.

BACKGROUND

Unless otherwise indicated herein, approaches described in this section are not prior art to the claims listed below and are not admitted as prior art by inclusion in this section.

Reflective QoS has been introduced to 5th-Generation (5G) QoS model as an optional user equipment (UE) feature. Reflective QoS enables a UE to create UE-derived QoS rules dynamically based on downlink traffic received by the UE. The UE can use such rules for mapping uplink traffic to QoS flows, as is otherwise done with "static" QoS rules provided by session management function (SMF).

According to the 3rd-Generation Partnership Project (3GPP), in Stage 2 that a "non-stop" reflective QoS Indicator (RQI) bit would be sent in downlink (DL) packets to activate or keep alive a given UE-derived QoS rule when the 5G Core (5GC) determines to use reflective QoS for a specific service data flow (SDF). Therefore, to support reflective QoS, the UE is required to inspect every downlink packet to identify the RQI bit and, accordingly, extract the 5-tuple Internet Protocol (IP) header in order for the UE to detect whether or not any corresponding UE-derived QoS rule already exists. If there is no existing UE-derived QoS rule, the UE would need to create and activate one for potential corresponding uplink (UL) traffic. However, this tends to cause increased requirements on UE processing and power consumption. Moreover, the resultant complexity would be further exacerbated as DL and UL data rates increase and as the number of concurrent QoS rules increase. This may undesirably and negatively impact a maximum throughput, thereby degrading overall UE performance.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In view of aforementioned issues, while it is important to preserve the characteristics of reflective QoS, it is also critical to ensure reflective QoS remains technically feasible. Accordingly, various schemes, solutions, techniques, designs, methods and apparatus are provided in the present disclosure to address or otherwise resolve the aforementioned issues.

In one aspect, a method may involve a processor of a user equipment (UE) receiving, from a wireless network, control signaling that activates support of reflective QoS by the UE. The method may also involve the processor determining whether a predefined condition exists. The method may further involve the processor indicating, to the wireless network, a revocation of a previously indicated support of the reflective QoS by the UE responsive to the determining indicating that the predefined condition exists.

In one aspect, a method may involve a processor of a UE supporting reflective QoS in a wireless communication with a wireless network by generating a plurality of active UE-derived QoS rules. The method may also involve the processor deleting one or more UE-derived QoS rules among a plurality of active UE-derived QoS rules each with a respective reflective QoS (RQ) timer running.

In one aspect, a method may involve a processor of a UE supporting reflective QoS in a wireless communication with a wireless network. The method may also involve the processor deleting one or more UE-derived QoS rules upon release of a protocol data unit (PDU) session in the wireless communication with the wireless network.

In one aspect, an apparatus may include a processor. The processor may be capable of: (1) receiving, from a wireless network, control signaling that activates support of reflective QoS by the UE; (2) determining whether a predefined condition exists; and (3) indicating, to the wireless network, a change in a capability of the UE to support the reflective QoS by the apparatus responsive to the determining indicating that the predefined condition exists.

It is noteworthy that, although description provided herein may be in the context of certain radio access technologies, networks and network topologies such as 5G New Radio (NR), the proposed concepts, schemes and any variation(s)/derivative(s) thereof may be implemented in, for and by other types of radio access technologies, networks and network topologies (e.g., Long-Term Evolution (LTE), LTE-Advanced, LTE-Advanced Pro, Internet-of-Things (IoT) and Narrow Band Internet of Things (NB-IoT)). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
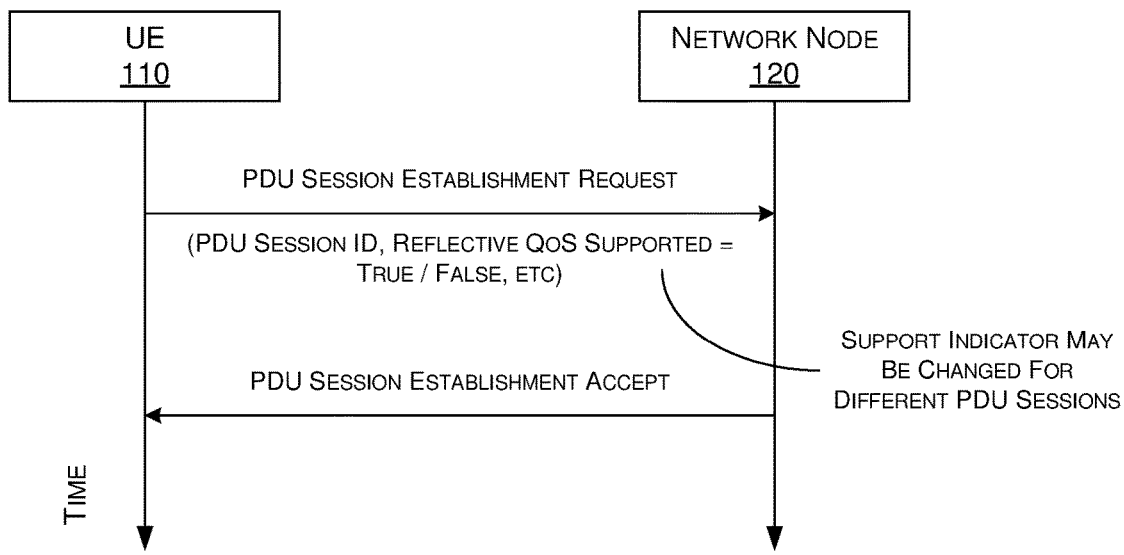
FIG. 1 is a diagram of an example scenario of signaling flows in accordance with an implementation of the present disclosure.
Figure 1:
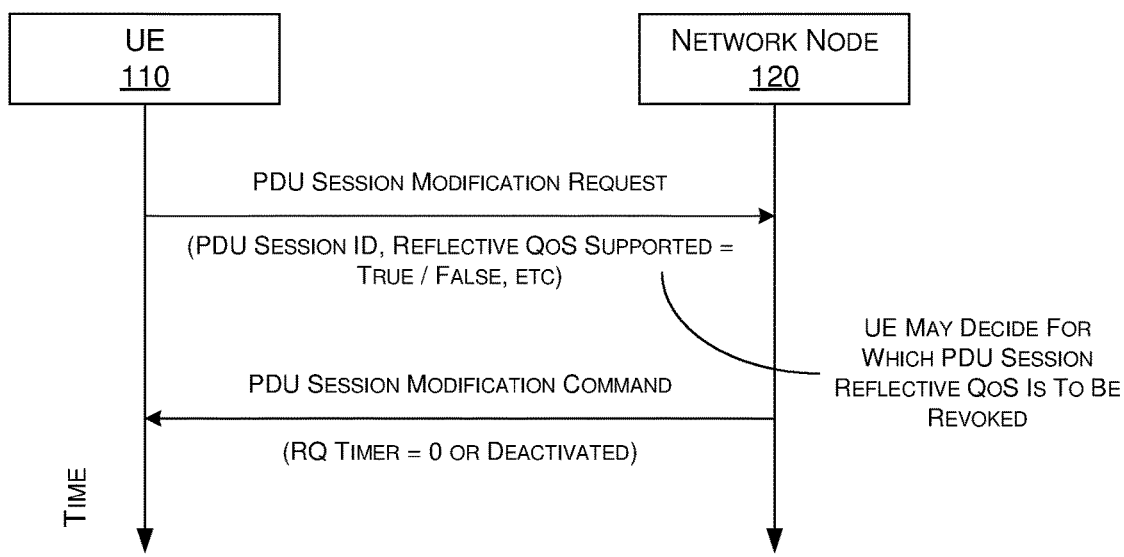

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to reflective QoS control in wireless communications. According to the present disclosure, a number of possible solutions may be implemented separately or jointly. That is, although these possible solutions may be described below separately, two or more of these possible solutions may be implemented in one combination or another.

In view of the large number of QoS rules and packet filters a UE may need to evaluate at any one time in support of reflective QoS, UE processing overhead would expand as the number of concurrent QoS rules and packet filters increase. On the other hand, the total number of concurrent rules and filters a UE may support is limited and implementation-specific. Nonetheless, unlike SMF-provided QoS rules, a UE-derived QoS rule is created implicitly (e.g., via downlink traffic without negotiation with the network). Thus, under a proposed scheme in accordance with the present disclosure, a UE may notify the network when the following conditions exist: (1) when a given UE-derived QoS rule cannot be created; and (2) when a given UE-derived QoS rule is deleted although a corresponding reflective QoS (RQ) timer is running (e.g., to accommodate a new UE-derived QoS rule). Under the proposed scheme, which UE-derived QoS rule to be deleted is left up to UE implementation. For instance, among multiple UE-derived QoS rules, a least-used UE-derived QoS rule for deletion. The least-used UE-derived QoS rule may be one that has the longest running RQ timer among all the UE-derived QoS rules.

In one approach under the proposed scheme, a 5G UE may trigger explicit Session Management signaling procedure to indicate to the network one or more of the following: (1) that a given UE-derived QoS rule cannot be created; (2) that a maximum number of UE-derived QoS rules has been reached; (3) that a maximum number of packet filters has been reached; and (4) that a conflict with one or more existing UE-derived QoS rules is detected. Advantageously, this approach may allow the UE to immediately respond to a request associated to reflective QoS.

In another approach under the proposed scheme, a 5G UE may remove a running UE-derived QoS rule when any of the following events occurs: (1) a network request or UE-triggered PDU session release procedure; (2) a network request or UE-triggered procedure to deactivate reflective QoS; (3) a network request to establish a new UE-derived QoS rule while the maximum number of supported UE-derived rules has been reached; (4) a network request to create a QoS rule (either preconfigured, provided, or UE-derived QoS rule) which conflicts with one or more existing UE-derived QoS rules.

It is noteworthy that a UE configured to support reflective QoS may not always be able to comply with excessively-high data rates due to the need to inspect a large number of packets, the need to perform QoS rule check, and the need to create QoS rules within each time unit. Put differently, support for reflective QoS by a UE may become not feasible at reasonable complexity depending on data rates. In other words, reflective QoS may limit the achievable throughput of a UE with 5G NR, and this situation needs to be avoided.

Accordingly, there may be two different implications as to how to dimension a UE. That is, either full reflective QoS operation may be assumed or partial reflective QoS operation may be assumed, and both may be possible under the proposed scheme. Data rates achieved by the UE designated with the assumption of full reflective QoS operation may be lower than or equal to data rates achieved by the UE designated with the assumption of partial reflective QoS operation.

In view of the above, under another proposed scheme in accordance with the present disclosure, a UE may be allowed to request for turning off reflective QoS in Stage 3. In particular, the capability for turning off reflective QoS may be implemented on a per-UE basis (e.g., in a Registration Management procedure) and/or on a per-PDU session basis (e.g., in a Session Management procedure). Moreover, such UE capability may be modified (e.g., either by a Connection Management procedure or a Session Management procedure) during the UE lifetime.

Under the proposed scheme, support of reflective QoS by a UE may be indicated as an UE capability via non-access stratum (NAS) Registration Management procedure. Accordingly, the UE capability may be carried in an Initial Registration procedure, and may in addition be modified by a Mobility/Periodic/Registration Update procedure.

Alternatively, support of reflective QoS by a UE may be indicated per-PDU session via a NAS Session Management procedure. The UE capability may be indicated to the network during a PDU Session Establishment procedure and may be modified through a PDU Session Modification procedure.

FIG. 1 illustrates an example scenario 100 of signaling flows in accordance with an implementation of the present disclosure. Scenario 100 may involve a UE 110 and a network node 120 (e.g., eNB, gNB or transmit/receive point (TRP)). Referring to part (A) of FIG. 1, in a PDU Session Establishment procedure, UE 110 may transmit a PDU Session Establishment Request message to network node 120. The message may include information such as, for example and without limitation, a PDU session ID and an indication as to whether reflective QoS is supported (e.g., bit "1" indicating true/supported or bit "0" indicating false/not supported). The indication regarding support for reflective QoS may be changed by UE 110 for different PDU sessions (e.g., on a per-PDU session basis). In response, network node 120 may transmit a PDU Session Establishment Accept message to UE 110. Referring to part (B) of FIG. 1, in a PDU Session Modification procedure, UE 110 may transmit a PDU Session Modification Request message to network node 120. The message may include information such as, for example and without limitation, a PDU session ID and an indication as to whether reflective QoS is supported (e.g., bit "1" indicating true/supported or bit "0" indicating false/not supported). UE 110 may decide for which PDU session(s) reflective QoS is to be revoked. In response, network node 120 may transmit a PDU Session Modification Command message to UE 110. The message may indicate a value for a RQ timer (e.g., value 0 or a "deactivate" command) to deactivate a respective PDU session corresponding to the RQ timer.

Under the proposed scheme, modification of UE capability of reflective QoS may be triggered by one or more conditions. For instance, a UE may determine to modify its capability in support of reflective QoS when the UE is not able to comply with high data rates. Alternatively, or additionally, the UE may determine modify its capability in support of reflective QoS in order to conserve power or otherwise reduce power consumption. Alternatively, or additionally, the UE may determine modify its capability in support of reflective QoS in order to reduce heating (e.g., when a temperature of a portion of the UE as indicated by a temperature sensor exceeds a threshold). It is noteworthy that an operator may utilize AT commands to enable or disable support for reflective QoS by a UE (e.g., per PDU session, for all PDU sessions, or per deep neural network (DNN)).

Under the proposed scheme, a UE may indicate to the network a maximum number of supported UE-derived QoS rules to be supported in Stage 3. Since the maximum number of supported UE derived QoS rules may be implementation-specific, such capability may be indicated to prevent capability imbalance between the network and the UE in order to ensure predictable UE behavior.

Under the proposed scheme, a UE supporting reflective QoS may associate to one or more maximum data rates at which reflective QoS may operate and beyond which reflective QoS would not operate. That is, the UE may be capable of indicating the one or more maximum data rates at which reflective QoS may operate and beyond which reflective QoS would not operate. For instance, either the network does not set a reflective QoS indicator (RQI) bit to the UE, or the UE may simply ignore the RQI. It is noteworthy that the term "maximum data rate" herein refers to a maximum flow bit rate or the session aggregate maximum bit rate (AMBR).

Under the proposed scheme, a UE supporting reflective QoS may delete one, some or all UE-derived QoS rules upon release of the PDU session.

Illustrative Implementations

Figure 2:
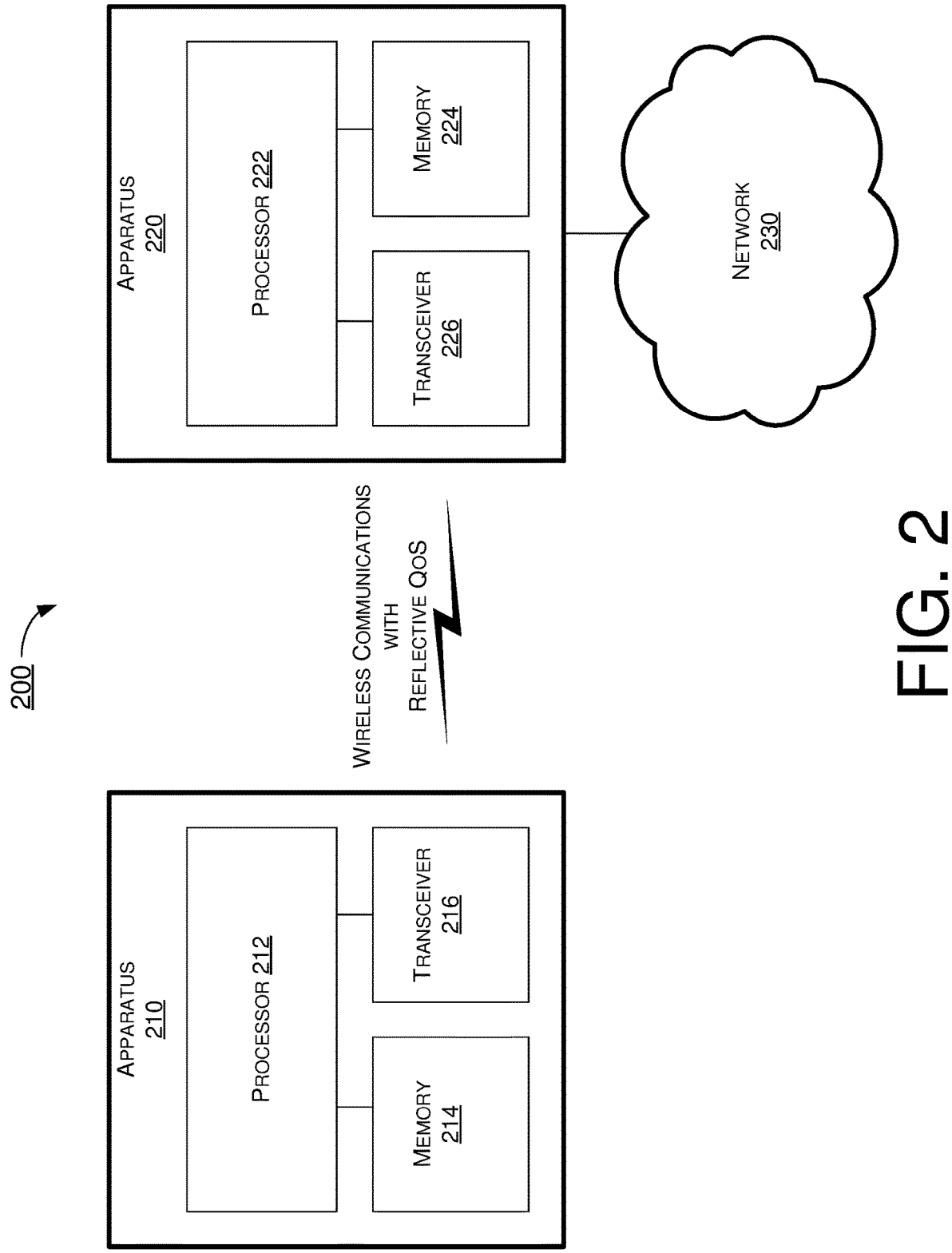
FIG. 2 is a block diagram of an example communication environment in accordance with an implementation of the present disclosure.

FIG. 2 illustrates an example communication environment 200 having an example apparatus 210 and an example apparatus 220 in accordance with an implementation of the present disclosure. Each of apparatus 210 and apparatus 220 may perform various functions to implement schemes, techniques, processes and methods described herein pertaining to reflective QoS control in wireless communications, including various schemes described above as well as processes 300 and 400 described below.

Each of apparatus 210 and apparatus 220 may be a part of an electronic apparatus, which may be a UE such as a portable or mobile apparatus, a wearable apparatus, a wireless communication apparatus or a computing apparatus. For instance, each of apparatus 210 and apparatus 220 may be implemented in a smartphone, a smartwatch, a personal digital assistant, a digital camera, or a computing equipment such as a tablet computer, a laptop computer or a notebook computer. Each of apparatus 210 and apparatus 220 may also be a part of a machine type apparatus, which may be an IoT or NB-IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center.

Alternatively, each of apparatus 210 and apparatus 220 may be implemented in the form of one or more integrated-circuit (IC) chips such as, for example and without limitation, one or more single-core processors, one or more multi-core processors, or one or more complex-instruction-set-computing (CISC) processors. Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In some implementations, at least one of apparatus 210 and apparatus 220 may be a part of an electronic apparatus, which may be a network node such as a TRP, a base station, a small cell, a router or a gateway. For instance, at least one of apparatus 210 and apparatus 220 may be implemented in an eNodeB in an LTE, LTE-Advanced or LTE-Advanced Pro network or in a gNB in a 5G, NR, IoT or NB-IoT network. Alternatively, at least one of apparatus 210 and apparatus 220 may be implemented in the form of one or more IC chips such as, for example and without limitation, one or more single-core processors, one or more multi-core processors, or one or more CISC processors.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including reflective QoS control in wireless communications in accordance with various implementations of the present disclosure.

In some implementations, apparatus 210 may also include a transceiver 216 coupled to processor 212 and capable of wirelessly transmitting and receiving data. In some implementations, apparatus 210 may further include a memory 214 coupled to processor 212 and capable of being accessed by processor 212 and storing data therein. In some implementations, apparatus 220 may also include a transceiver 226 coupled to processor 222 and capable of wirelessly transmitting and receiving data. In some implementations, apparatus 220 may further include a memory 224 coupled to processor 222 and capable of being accessed by processor 222 and storing data therein. Accordingly, apparatus 210 and apparatus 220 may wirelessly communicate with each other via transceiver 216 and transceiver 226, respectively.

To aid better understanding, the following description of the operations, functionalities and capabilities of each of apparatus 210 and apparatus 220 is provided in the context of a mobile communication environment in which apparatus 210 is implemented in or as a wireless communication device, a communication apparatus or a UE and apparatus 220 is implemented in or as a network node (e.g., base station) of a wireless network 230.

In one aspect under one or more proposed schemes in accordance with the present disclosure, processor 212 of apparatus 210 as a UE may receive, via transceiver 216 from apparatus 220 as a network node of a wireless network, control signaling that activates support of reflective quality of service (QoS) by apparatus 210. Additionally, processor 212 may determine whether a predefined condition exists. Moreover, processor 212 may indicate, to apparatus 220, a revocation of a previously indicated support of the reflective QoS by apparatus 210 in response to the determining indicating that the predefined condition exists.

In some implementations, the predefined condition may include one or more of the following: (a) a condition in which apparatus 210 is not able to comply with a data rate required by the reflective QoS; (b) a condition in which apparatus 210 is in or is entering a power-saving mode; and (c) a condition in which a temperature of a portion of apparatus 210 exceeds a threshold.

In some implementations, in indicating the revocation of a previously indicated support of the reflective QoS by apparatus 210, processor 212 may transmit, via transceiver 216 to apparatus 220, an UL signaling message indicating that a capability bit of apparatus 210 to support the reflective QoS is set to a value representing "not supported" (e.g., set to "0").

In some implementations, the UL signaling message may further indicate a cause for not creating the given UE-derived QoS rule.

In some implementations, the cause may indicate that a maximum number of supported UE-derived QoS rules is reached.

In some implementations, the cause may indicate that a maximum number of supported packet filters is reached.

In some implementations, in indicating the change in the capability of apparatus 210 to support the reflective QoS, processor 212 may indicate the change in the capability of apparatus 210 to support the reflective QoS during a PDU session.

In some implementations, in indicating the change in the capability of apparatus 210 to support the reflective QoS during a PDU session, processor 212 may perform a number of operations. For instance, processor 212 may determine a policy decision function (PDF) session for which support of reflective QoS is to be revoked. Additionally, processor 212 may transmit, via transceiver 216 to apparatus 220, a PDU Session Establishment Request message indicating a PDU session ID of the determined PDU session and a change in status of whether the reflective QoS is supported by apparatus 210. Moreover, processor 212 may receive, via transceiver 216 from apparatus 220, a PDU Session Establishment Accept message.

In some implementations, processor 212 may also delete one or more UE-derived QoS rules upon release of the PDU session.

In some implementations, processor 212 may also modify the capability of apparatus 210 to support the reflective QoS during a PDU session modification procedure.

In some implementations, in modifying the capability of apparatus 210 to support the reflective QoS, processor 212 may revoke support for the reflective QoS.

In some implementations, in modifying the capability of apparatus 210 to support the reflective QoS, processor 212 may revoke support for the reflective QoS during one or more PDU sessions.

In some implementations, in modifying the capability of apparatus 210 to support the reflective QoS, processor 212 may perform a number of operations. For instance, processor 212 may determine a policy decision function session for which support of reflective QoS is to be revoked. Additionally, processor 212 may transmit, via transceiver 216 to apparatus 220, a PDU Session Modification Request message indicating a PDU session ID of the determined PDU session and a change in status of whether the reflective QoS is supported by apparatus 210. Moreover, processor 212 may receive, via transceiver 216 from apparatus 220, a PDU Session Modification Command message indicating deactivation of support for the reflective QoS.

In another aspect under one or more proposed schemes in accordance with the present disclosure, processor 212 of apparatus 210 as a UE may support reflective QoS in a wireless communication with wireless network 230 by generating a plurality of active UE-derived QoS rules. Furthermore processor 212 may delete one or more UE-derived QoS rules among a plurality of active UE-derived QoS rules each with a respective reflective QoS (RQ) timer running.

In some implementations, the deleted one or more UE-derived QoS rules may include a least used UE-derived QoS rule among the plurality of active UE-derived QoS rules.

In some implementations, the least used UE-derived QoS rule may include one of the plurality of active UE-derived QoS rules for which the respective RQ timer has been running a longest time compared to respective RQ timers of other UE-derived QoS rules among the plurality of active UE-derived QoS rules.

In some implementations, processor 212 may further perform a number of operations. For instance, processor 212 may receive, via transceiver 216 from apparatus 220, control signaling that activates support of QoS by apparatus 210. Moreover, processor 212 may indicate, to apparatus 220, deletion of the deleted one or more UE-derived QoS rules although the respective RQ timer of each of the deleted one or more UE-derived QoS rules is running.

In yet another aspect under one or more proposed schemes in accordance with the present disclosure, processor 212 of apparatus 210 as a UE may support reflective QoS in a wireless communication with wireless network 230 through apparatus 220 as a network node. Processor 212 may delete one or more UE-derived QoS rules upon release of a PDU session in the wireless communication with apparatus 220.

Illustrative Processes

Figure 3:
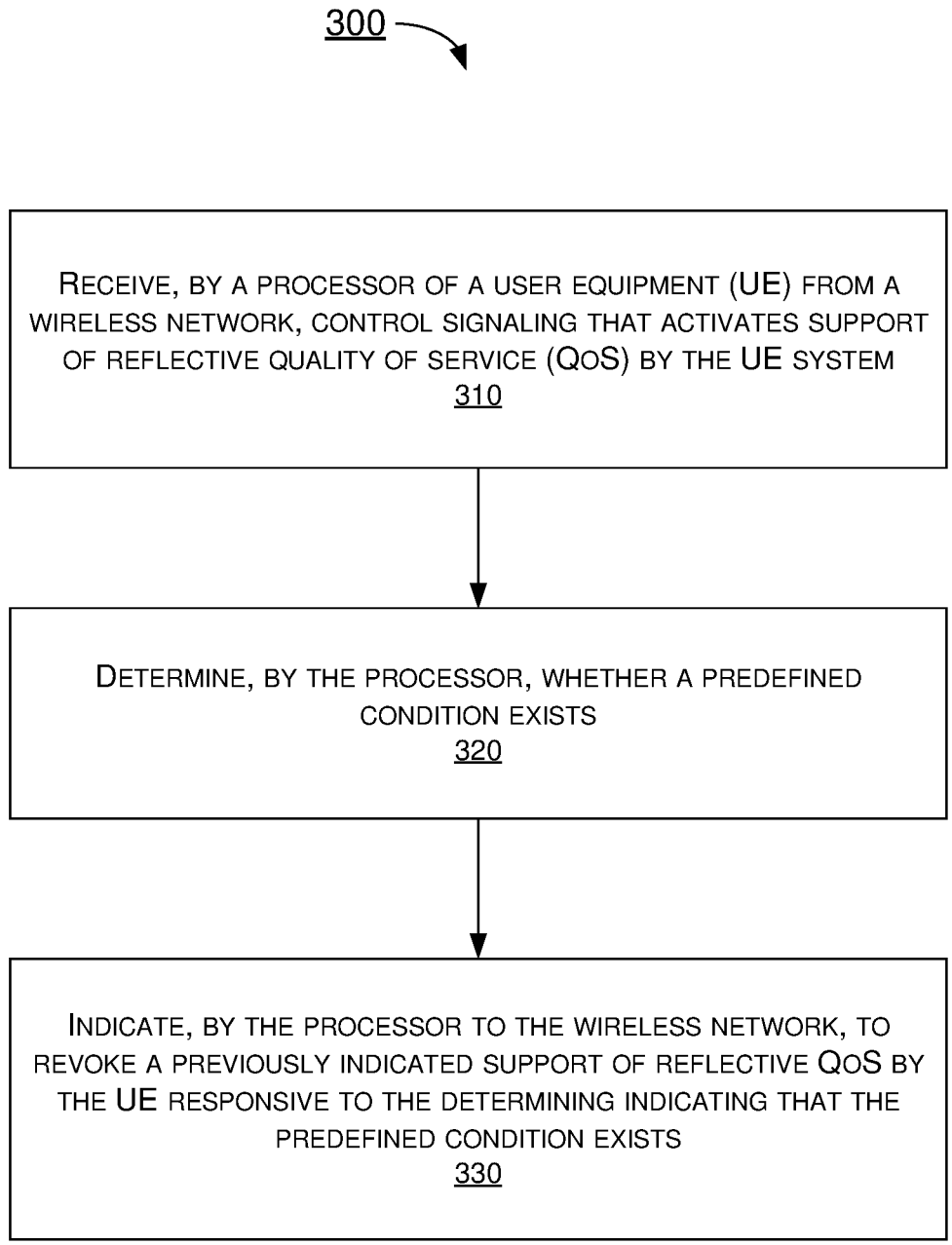
FIG. 3 is a flowchart of an example process in accordance with an implementation of the present disclosure.

FIG. 3 illustrates an example process 300 in accordance with an implementation of the present disclosure. Process 300 may be an example implementation of one or more of the proposed schemes described above with respect to reflective QoS control in wireless communications in accordance with the present disclosure. Process 300 may represent an aspect of implementation of features of apparatus 210 and/or apparatus 220. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may also be repeated partially or entirely. Process 300 may be implemented by apparatus 210, apparatus 220 and/or any suitable wireless communication device, UE, base station or machine type devices. Solely for illustrative purposes and without limitation, process 300 is described below in the context of apparatus 210 as a UE and apparatus 220 as a network node (e.g., gNB) of a mobile communication system (e.g., 3G/NR mobile network). Process 300 may begin at block 310.

At 310, process 300 may involve processor 212 of apparatus 210 as a UE receiving, via transceiver 216 from apparatus 220 as a network node of a wireless network, control signaling that activates support of reflective quality of service (QoS) by apparatus 210. Process 300 may proceed from 310 to 320.

At 320, process 300 may involve processor 212 determining whether a predefined condition exists. Process 300 may proceed from 320 to 330.

At 330, process 300 may involve processor 212 indicating, to apparatus 220, a revocation of a previously indicated support of the reflective QoS by apparatus 210 in response to the determining indicating that the predefined condition exists.

In some implementations, the predefined condition may include one or more of the following: (a) a condition in which apparatus 210 is not able to comply with a data rate required by the reflective QoS; (b) a condition in which apparatus 210 is in or is entering a power-saving mode; and (c) a condition in which a temperature of a portion of apparatus 210 exceeds a threshold.

In some implementations, in indicating the revocation of the previously indicated support of the reflective QoS by apparatus 210, process 300 may involve processor 212 transmitting, via transceiver 216 to apparatus 220, an UL signaling message indicating that a capability bit of the UE to support the reflective QoS is set to a value representing "not supported" (e.g., set to "0").

In some implementations, the UL signaling message may further indicate a cause for not creating the given UE-derived QoS rule.

In some implementations, the cause may indicate that a maximum number of supported UE-derived QoS rules is reached.

In some implementations, the cause may indicate that a maximum number of supported packet filters is reached.

In some implementations, in indicating the change in the capability of apparatus 210 to support the reflective QoS, process 300 may involve processor 212 indicating the change in the capability of apparatus 210 to support the reflective QoS during a PDU session.

In some implementations, in indicating the change in the capability of apparatus 210 to support the reflective QoS during a PDU session, process 300 may involve processor 212 performing a number of operations. For instance, process 300 may involve processor 212 determining a policy decision function session for which support of reflective QoS is to be revoked. Additionally, process 300 may involve processor 212 transmitting, via transceiver 216 to apparatus 220, a PDU Session Establishment Request message indicating a PDU session identification (ID) of the determined PDU session and a change in status of whether the reflective QoS is supported by apparatus 210. Moreover, process 300 may involve processor 212 receiving, via transceiver 216 from apparatus 220, a PDU Session Establishment Accept message.

In some implementations, process 300 may further involve processor 212 deleting one or more UE-derived QoS rules upon release of the PDU session.

In some implementations, process 300 may further involve processor 212 modifying the capability of apparatus 210 to support the reflective QoS during a PDU session modification procedure.

In some implementations, in modifying the capability of apparatus 210 to support the reflective QoS, process 300 may involve processor 212 revoking support for the reflective QoS.

In some implementations, in modifying the capability of apparatus 210 to support the reflective QoS, process 300 may involve processor 212 revoking support for the reflective QoS during one or more PDU sessions.

In some implementations, in modifying the capability of apparatus 210 to support the reflective QoS, process 300 may involve processor 212 performing a number of operations. For instance, process 300 may involve processor 212 determining a policy decision function session for which support of reflective QoS is to be revoked. Additionally, process 300 may involve processor 212 transmitting, via transceiver 216 to apparatus 220, a PDU Session Modification Request message indicating a PDU session ID of the determined PDU session and a change in status of whether the reflective QoS is supported by apparatus 210. Moreover, process 300 may involve processor 212 receiving, via transceiver 216 from apparatus 220, a PDU Session Modification Command message indicating deactivation of support for the reflective QoS.

Figure 4:
FIG. 4 is a flowchart of an example process in accordance with an implementation of the present disclosure.

FIG. 4 illustrates an example process 400 in accordance with an implementation of the present disclosure. Process 400 may be an example implementation of one or more of the proposed schemes described above with respect to reflective QoS control in wireless communications in accordance with the present disclosure. Process 400 may represent an aspect of implementation of features of apparatus 210 and/or apparatus 220. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 210, apparatus 220 and/or any suitable wireless communication device, UE, base station or machine type devices. Solely for illustrative purposes and without limitation, process 400 is described below in the context of apparatus 210 as a UE and apparatus 220 as a network node (e.g., gNB) of a mobile communication system (e.g., 5G/NR mobile network). Process 400 may begin at block 410.

At 410, process 400 may involve processor 212 of apparatus 210 as a UE supporting reflective QoS in a wireless communication with wireless network 230 by generating a plurality of active UE-derived QoS rules. Process 400 may proceed from 410 to 420.

At 420, process 400 may involve processor 212 deleting one or more UE-derived QoS rules among a plurality of active UE-derived QoS rules each with a respective reflective QoS (RQ) timer running.

In some implementations, the deleted one or more UE-derived QoS rules may include a least used UE-derived QoS rule among the plurality of active UE-derived QoS rules.

In some implementations, the least used UE-derived QoS rule may include one of the plurality of active UE-derived QoS rules for which the respective RQ timer has been running a longest time compared to respective RQ timers of other UE-derived QoS rules among the plurality of active UE-derived QoS rules.

In some implementations, process 400 may further involve processor 212 performing a number of operations. For instance, process 400 may involve processor 212 receiving, via transceiver 216 from apparatus 220, control signaling that activates support of QoS by apparatus 210. Moreover, process 400 may involve processor 212 indicating, to apparatus 220, deletion of the deleted one or more UE-derived QoS rules although the respective RQ timer of each of the deleted one or more UE-derived QoS rules is running.

Figure 5:
FIG. 5 is a flowchart of an example process in accordance with an implementation of the present disclosure.

FIG. 5 illustrates an example process 500 in accordance with an implementation of the present disclosure. Process 500 may be an example implementation of one or more of the proposed schemes described above with respect to reflective QoS control in wireless communications in accordance with the present disclosure. Process 500 may represent an aspect of implementation of features of apparatus 210 and/or apparatus 220. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 210, apparatus 220 and/or any suitable wireless communication device, UE, base station or machine type devices. Solely for illustrative purposes and without limitation, process 500 is described below in the context of apparatus 210 as a UE and apparatus 220 as a network node (e.g., gNB) of a mobile communication system (e.g., 5G/NR mobile network). Process 500 may begin at block 510.

At 510, process 500 may involve processor 212 of apparatus 210 as a UE supporting reflective QoS in a wireless communication with wireless network 230. Process 500 may proceed from 510 to 520.

At 520, process 500 may involve processor 212 deleting one or more UE-derived QoS rules upon release of a PDU session in the wireless communication with wireless network 230.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of a user equipment (UE), control signaling from a wireless network that activates support of reflective quality of service (QoS) by the UE;
   determining, by the processor, whether a predefined condition exists; and
   indicating, by the processor to the wireless network, a revocation of a previously indicated support of the reflective QoS by the UE responsive to the determining indicating that the predefined condition exists.

2. The method of claim 1, wherein the predefined condition comprises one or more of:
   a condition in which the UE is not able to comply with a data rate required by the reflective QoS;
   a condition in which the UE is in or is entering a power-saving mode; and
   a condition in which a temperature of a portion of the UE exceeds a threshold.

3. The method of claim 1, wherein the indicating the revocation of the previously indicated support of the reflective QoS by the UE comprises transmitting, to the wireless network, an uplink (UL) signaling message indicating that a capability bit of the UE to support the reflective QoS is set to a value representing "not supported".

4. The method of claim 3, wherein the UL signaling message further indicates a cause for not creating the given UE-derived QoS rule.

5. The method of claim 4, wherein the cause indicates that a maximum number of supported UE-derived QoS rules is reached.

6. The method of claim 4, wherein the cause indicates that a maximum number of supported packet filters is reached.

7. The method of claim 1, further comprising:
   modifying, by the processor, the capability of the UE to support the reflective QoS during a protocol data unit (PDU) session modification procedure.

8. The method of claim 7, wherein the modifying of the capability of the UE to support the reflective QoS comprises revoking support for the reflective QoS.

9. The method of claim 7, wherein the modifying of the capability of the UE to support the reflective QoS comprises revoking support for the reflective QoS during one or more PDU sessions.

10. The method of claim 7, wherein the modifying of the capability of the UE to support the reflective QoS comprises:
    determining a policy decision function session for which support of reflective QoS is to be revoked;
    transmitting, to the wireless network, a PDU Session Modification Request message indicating a PDU session identification (ID) of the determined PDU session and a change in status of whether the reflective QoS is supported by the UE; and
    receiving, from the wireless network, a PDU Session Modification Command message indicating deactivation of support for the reflective QoS.

11. The method of claim 1, further comprising:
    deleting, by the processor, one or more UE-derived QoS rules upon release of a protocol data unit (PDU) session responsive to the reflective QoS being supported during the PDU session.

12. A method, comprising:
    supporting, by a processor of a user equipment (UE), reflective quality of service (QoS) in a wireless communication with a wireless network by generating a plurality of active UE-derived QoS rules;
    deleting, by the processor, one or more UE-derived QoS rules among the plurality of active UE-derived QoS rules each with a respective reflective QoS (RQ) timer running; and
    indicating, by the processor to the wireless network, deletion of the deleted one or more UE-derived QoS rules although the respective RQ timer of each of the deleted one or more UE-derived QoS rules is running.

13. The method of claim 12, wherein the deleted one or more UE-derived QoS rules comprises a least used UE-derived QoS rule among the plurality of active UE-derived QoS rules.

14. The method of claim 13, wherein the least used UE-derived QoS rule comprises one of the plurality of active UE-derived QoS rules for which the respective RQ timer has been running a longest time compared to respective RQ timers of other UE-derived QoS rules among the plurality of active UE-derived QoS rules.

15. An apparatus implementable in a user equipment (UE), comprising: a processor capable of:
    receiving, from a wireless network, control signaling that activates support of reflective quality of service (QoS) by the UE;
    determining whether a predefined condition exists; and
    indicating, to the wireless network, a change in a capability of the UE to support the reflective QoS by the apparatus responsive to the determining indicating that the predefined condition exists.

16. The apparatus of claim 15, wherein the processor is further capable of modifying the capability of the UE to support the reflective QoS during a protocol data unit (PDU) session modification procedure by performing operations comprising:
    determining a policy decision function session for which support of reflective QoS is to be revoked;
    transmitting, to the wireless network, a PDU Session Modification Request message indicating a PDU session identification (ID) of the determined PDU session and a change in status of whether the reflective QoS is supported by the UE; and
    receiving, from the wireless network, a PDU Session Modification Command message indicating deactivation of support for the reflective QoS.

17. The apparatus of claim 15, wherein the processor is further capable of indicating, to the wireless network, to revoke a previously indicated support of reflective QoS by the UE responsive to the determining indicating that the predefined condition exists.

18. The apparatus of claim 15, wherein the processor is further capable of either or both of:
    deleting one or more UE-derived QoS rules upon release of a protocol data unit (PDU) session; and
    modifying the capability of the UE to support the reflective QoS during a PDU session modification procedure.

19. The apparatus of claim 15, wherein the processor is further capable of deleting one or more UE-derived QoS rules among a plurality of active UE-derived QoS rules each with a respective reflective QoS (RQ) timer running.

* * * * *